US011916866B2

(12) United States Patent
Cheng et al.

(10) Patent No.: US 11,916,866 B2
(45) Date of Patent: Feb. 27, 2024

(54) SYSTEMS AND METHODS FOR UNSUPERVISED CYBERBULLYING DETECTION VIA TIME-INFORMED GAUSSIAN MIXTURE MODEL

(71) Applicant: Arizona Board of Regents on Behalf of Arizona State University, Tempe, AZ (US)

(72) Inventors: Lu Cheng, Tempe, AZ (US); Kai Shu, Mesa, AZ (US); Siqi Wu, Canberra (AU); Yasin Silva, Glendale, AZ (US); Deborah Hall, Phoenix, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 18 days.

(21) Appl. No.: 17/546,648

(22) Filed: Dec. 9, 2021

(65) Prior Publication Data

US 2022/0182351 A1  Jun. 9, 2022

Related U.S. Application Data

(60) Provisional application No. 63/123,291, filed on Dec. 9, 2020.

(51) Int. Cl.
*H04L 51/52* (2022.01)
*G06N 3/088* (2023.01)
(Continued)

(52) U.S. Cl.
CPC ............ *H04L 51/52* (2022.05); *G06F 40/30* (2020.01); *G06N 3/088* (2013.01); *H04L 51/212* (2022.05); *H04L 67/535* (2022.05)

(58) Field of Classification Search
CPC ..... H04L 51/52; H04L 51/212; H04L 67/535; G06F 40/30; G06N 3/088
See application file for complete search history.

(56) References Cited

U.S. PATENT DOCUMENTS 11,019,015 B1 * 5/2021 Shapira ................... H04L 51/52
11,138,237 B2 * 10/2021 Anders ................. G06F 16/355
(Continued)

OTHER PUBLICATIONS

Dzmitry Bahdanau, Kyunghyun Cho, and Yoshua Bengio. 2016. Neural machine translation by jointly learning to align and translate. arXiv preprint arXiv:1409.0473 (2016).
(Continued)

*Primary Examiner* — Benjamin M Thieu
(74) *Attorney, Agent, or Firm* — POLSINELLI PC

(57) ABSTRACT

A computer-implemented framework and/or system for cyberbullying detection is disclosed. The system includes two main components: (1) A representation learning network that encodes the social media session by exploiting multi-modal features, e.g., text, network, and time; and (2) a multi-task learning network that simultaneously fits the comment inter-arrival times and estimates the bullying likelihood based on a Gaussian Mixture Model. The system jointly optimizes the parameters of both components to overcome the shortcomings of decoupled training. The system includes an unsupervised cyberbullying detection model that not only experimentally outperforms the state-of-the-art unsupervised models, but also achieves competitive performance compared to supervised models.

10 Claims, 6 Drawing Sheets
(5 of 6 Drawing Sheet(s) Filed in Color)

(51) Int. Cl.
    G06F 40/30        (2020.01)
    H04L 51/212       (2022.01)
    H04L 67/50        (2022.01)

(56) References Cited

U.S. PATENT DOCUMENTS

| | | | | |
|---|---|---|---|---|
| 2014/0324719 | A1* | 10/2014 | Canal | G06F 16/958 |
| | | | | 705/319 |
| 2016/0261533 | A1* | 9/2016 | Cecchi | H04L 51/52 |
| 2017/0132215 | A1* | 5/2017 | Baughman | G06F 40/30 |
| 2020/0020447 | A1* | 1/2020 | Generoso | G16H 50/70 |
| 2021/0058352 | A1* | 2/2021 | Fogu | G06F 40/279 |
| 2022/0032198 | A1* | 2/2022 | Orrino | G06N 20/00 |

OTHER PUBLICATIONS

Varun Chandola, Arindam Banerjee, and Vipin Kumar. 2009. Anomaly detection: A survey. CSUR 41, 3 (2009), 15.

Despoina Chatzakou, Nicolas Kourtellis, Jeremy Blackburn, Emiliano De Cristo-faro, Gianluca Stringhini, and Athena Vakali. 2017. Mean birds: Detecting ag¬gression and bullying on twitter. In Websci. ACM, 13-22.

Nitesh V Chawla, Kevin W Bowyer, Lawrence O Hall, and W Philip Kegelmeyer. 2002. SMOTE: synthetic minority over-sampling technique. JAIR 16 (2002), 321-357.

Lu Cheng, Ruocheng Guo, and Huan Liu. 2019. Robust Cyberbullying Detection with Causal Interpretation. In WWW Companion.

Lu Cheng, Ruocheng Guo, Yasin Silva, Deborah Hall, and Huan Liu. 2019. Hi¬erarchical Attention Networks for Cyberbullying Detection on the Instagram Social Network. In SDM.

Lu Cheng, Jundong Li, Yasin Silva, Deborah Hall, and Huan Liu. 2019. PI-Bully: Personalized Cyberbullying Detection with Peer Influence. In IJCAI. AAAI.

Lu Cheng, Jundong Li, Yasin N Silva, Deborah L Hall, and Huan Liu. 2019. XBully: Cyberbullying Detection within a Multi-Modal Context. In WSDM. 339-347.

Harsh Dani, Jundong Li, and Huan Liu. 2017. Sentiment informed cyberbullying detection in social media. In ECML PKDD. Springer, 52-67.

Michele Di Capua, Emanuel Di Nardo, and Alfredo Petrosino. 2016. Unsupervised cyber bullying detection in social networks. In ICPR. IEEE, 432-437. Thomas G Dietterich. 2002. Machine learning for sequential data: A review. In SSPR. Springer, 15-30.

Karthik Dinakar, Birago Jones, Catherine Havasi, Henry Lieberman, and Rosalind Picard. 2012. Common sense reasoning for detection, prevention, and mitigation of cyberbullying. TiiS 2, 3 (2012), 18.

Karthik Dinakar, Roi Reichart, and Henry Lieberman. 2011. Modeling the detec¬tion of textual cyberbullying. In ICWSM.

Dorothy L Espelage, Melissa K Holt, and Rachael R Henkel. 2003. Examination of peer-group contextual effects on aggression during early adolescence. Child development 74, 1 (2003), 205-220.

Ruth Festl and Thorsten Quandt. 2013. Social relations and cyberbullying: The influence of individual and structural attributes on victimization and perpetration via the internet. Human communication research 39, 1 (2013), 101-126.

Aditya Grover, Aaron Zweig, and Stefano Ermon. 2018. Graphite: Iterative generative modeling of graphs. arXiv preprint arXiv:1803.10459 (2018).

Aabhaas Gupta, Wenxi Yang, Divya Sivakumar, Yasin N Silva, Deborah L Hall, and Maria Camila Nardini Barioni. 2020. Temporal Properties of Cyberbullying on Instagram. (2020).

Homa Hosseinmardi, Sabrina Arredondo Mattson, Rahat Ibn Rafiq, Richard Han, Qin Lv, and Shivakant Mishra. 2015. Analyzing labeled cyberbullying incidents on the instagram social network. In Socinfo. Springer, 49-66.

Homa Hosseinmardi, Rahat Ibn Rafiq, Richard Han, Qin Lv, and Shivakant Mishra. 2016. Prediction of cyberbullying incidents in a media-based social network. In ASONAM. IEEE, 186-192.

Qianjia Huang, Vivek Kumar Singh, and Pradeep Kumar Atrey. 2014. Cyber bullying detection using social and textual analysis. In SAM. ACM, 3-6.

Diederik P Kingma and Jimmy Ba. 2017. Adam: A method for stochastic opti¬mization. arXiv preprint arXiv:1412.6980 (2017).

Thomas N Kipf and Max Welling. 2016. Semi-supervised classification with graph convolutional networks. arXiv preprint arXiv:1609.02907 (2016).

Thomas N Kipf and Max Welling. 2016. Variational graph auto-encoders. arXiv preprint arXiv:1611.07308 (2016).

Yann LeCun, Sumit Chopra, Raia Hadsell, M Ranzato, and F Huang. 2006. A tutorial on energy-based learning. Predicting structured data 1, 0 (2006).

Jiwei Li, Minh-Thang Luong, and Dan Jurafsky. 2015. A hierarchical neural autoencoder for paragraphs and documents. arXiv preprint arXiv:1506.01057 (2015).

Ping Liu, Joshua Guberman, Libby Hemphill, and Aron Culotta. 2018. Forecasting the presence and intensity of hostility on Instagram using linguistic and social features. In ICWSM.

C Moessner. 2017. Cyberbullying, Trends and Tudes. NCPC. org. Accessed (2007).

Parma Nand, Rivindu Perera, and Abhijeet Kasture. 2016. "How Bullying is this Message?": A Psychometric Thermometer for Bullying.. In COLING. 695-706.

Online. [n. d.]. Ditch the Label (2013) The Annual Cyberbullying Survey. Available from https://www.ditchthelabel.org/wp-content/uploads/2016/07/cyberbullying2013.pdf.

Jing Qian, Anna Bethke, Yinyin Liu, Elizabeth Belding, and William Yang Wang. 2019. A Benchmark Dataset for Learning to Intervene in Online Hate Speech. arXiv preprint arXiv:1909.04251 (2019).

Rahat Ibn Rafiq, Homa Hosseinmardi, Richard Han, Qin Lv, Shivakant Mishra, and Sabrina Arredondo Mattson. 2015. Careful what you share in six seconds: Detecting cyberbullying instances in Vine. In ASONAM. ACM, 617-622.

Rahat Ibn Rafiq, Homa Hosseinmardi, Sabrina Arredondo Mattson, Richard Han, Qin Lv, and Shivakant Mishra. 2016. Analysis and detection of labeled cyber-bullying instances in Vine, a video-based social network. SNAM 6, 1 (2016), 88.

Elaheh Raisi and Bert Huang. 2017. Co-trained ensemble models for weakly supervised cyberbullying detection. In NIPS LLD Workshop.

Elaheh Raisi and Bert Huang. 2017. Cyberbullying detection with weakly supervised machine learning. In ASONAM. ACM, 409-416.

Walisa Romsaiyud, Kodchakorn na Nakornphanom, Pimpaka Prasertsilp, Piya-porn Nurarak, and Pirom Konglerd. 2017. Automated cyberbullying detection using clustering appearance patterns. In KST. IEEE, 242-247.

Guillaume Salha, Romain Hennequin, Viet Anh Tran, and Michalis Vazirgiannis. 2019. A degeneracy framework for scalable graph autoencoders. arXiv preprint arXiv:1902.08813 (2019).

Christina Salmivalli, Arja Huttunen, and Kirsti MJ Lagerspetz. 1997. Peer net¬works and bullying in schools. Scandinavian journal of psychology 38, 7 (1997), 305-312.

Yasin N Silva, Deborah L Hall, and Christopher Rich. 2018. BullyBlocker: toward an interdisciplinary approach to identify cyberbullying. SNAM 8, 1 (2018), 18.

Peter K Smith, Jess Mahdavi, Manuel Carvalho, Sonja Fisher, Shanette Russell, and Neil Tippett. 2008. Cyberbullying: Its nature and impact in secondary school pupils. 3ournal of child psychology and psychiatry 49, 4 (2008), 376-385.

Chunfeng Song, Feng Liu, Yongzhen Huang, Liang Wang, and Tieniu Tan. 2013. Auto-encoder based data clustering. In CIARP. Springer, 117-124.

Devin Soni and Vivek Singh. 2018. Time Reveals All Wounds: Modeling Temporal Dynamics of Cyberbullying Sessions. In ICWSM.

Daniel Svozil, Vladimir Kvasnicka, and Jiri Pospichal. 1997. Introduction to multi-layer feed-forward neural networks. Chemometr Intell Lab 39, 1 (1997), 43-62.

Miranda Witvliet, Tjeert Olthof, Jan B Hoeksma, Frits A Goossens, Marieke SI Smits, and Hans M Koot. 2010. Peer group affiliation of

(56) References Cited

OTHER PUBLICATIONS children: The role of perceived popularity, likeability, and behavioral similarity in bullying. Social Development 19, 2 (2010), 285-303.

Junyuan Xie, Ross Girshick, and Ali Farhadi. 2016. Unsupervised deep embedding for clustering analysis. In ICML. 778-787.

Jun-Ming Xu, Kwang-Sung Jun, Xiaojin Zhu, and Amy Bellmore. 2012. Learning from bullying traces in social media. In NAACL HLT. ACL, 656-666.

Bo Yang, Xiao Fu, Nicholas D Sidiropoulos, and Mingyi Hong. 2017. Towards k-means-friendly spaces: Simultaneous deep learning and clustering. In ICML. PMLR. org, 3861-3870.

Zichao Yang, Diyi Yang, Chris Dyer, Xiaodong He, Alex Smola, and Eduard Hovy. 2016. Hierarchical attention networks for document classification. In NAACL HLT. 1780-1789.

Shuangfei Zhai, Yu Cheng, Weining Lu, and Zhongfei Zhang. 2016. Deep struc¬tured energy based models for anomaly detection. arXiv preprint arXiv:1605.07717 (2016).

Caleb Ziems, Ymir Vigfusson, and Fred Morstatter. 2020. Aggressive, Repetitive, Intentional, Visible, and Imbalanced: Refining Representations for Cyberbullying Classification. In ICWSM.

Bo Zong, Qi Song, Martin Renqiang Min, Wei Cheng, Cristian Lumezanu, Daeki Cho, and Haifeng Chen. 2018. Deep autoencoding gaussian mixture model for unsupervised anomaly detection. In ICLR.

\* cited by examiner

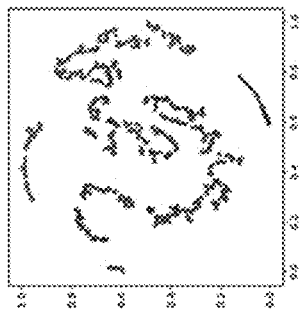
(a) XBully
FIG. 2A
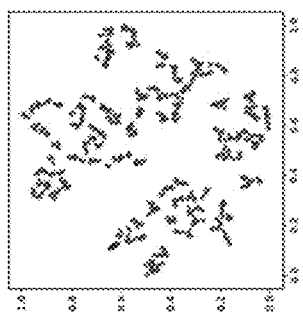
(b) HAE
FIG. 2B
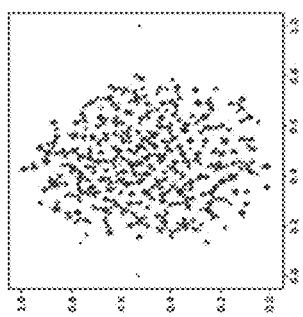
(e) UCIDXtext
FIG. 2E
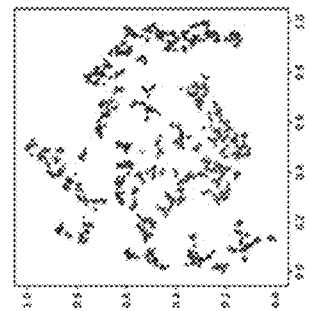
(c) DCN
FIG. 2C
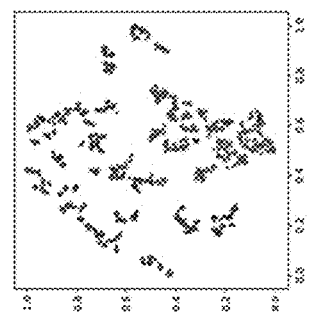
(d) DAGMM
FIG. 2D
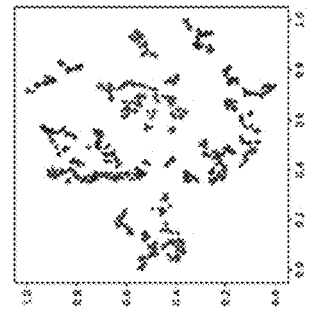
(f) UCIDXtime
FIG. 2F
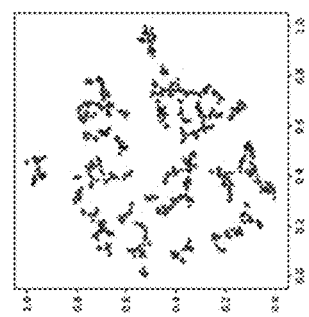
(g) UCIDXgraph
FIG. 2G
(h) UCID
FIG. 2H

(b) *Vine*

(a) *Instagram* this fuckin bitch .
that 's fucking disgusting its fanfic about zayn harry and lux its nasty .
she is sick bitch ... i m disgusted .
that was most fucked up fanfic i have ever read in my whole entire life .... wow just wow .
what hell is wrong with her .
why would you right that why would you think of that .

(a) *Predicted as bullying session.*

FIG. 5A how do u get gif i ca nt save them to my phone .
larry zayn being sexy and niall and liam doing something stupid in back .
larry having their little moment there .
are of you actually fans of one direction .
just because ur elounor shipper does n't mean you have to be bitch lol shut up .
i feel like they have changed so many peoples life 's including mine .

(b) *Predicted as non-bullying session.*

FIG. 5B

SYSTEMS AND METHODS FOR UNSUPERVISED CYBERBULLYING DETECTION VIA TIME-INFORMED GAUSSIAN MIXTURE MODEL

CROSS REFERENCE TO RELATED APPLICATIONS

This is a U.S. non-provisional patent application and claims the benefit of U.S. provisional application No. 63/123,291 filed on Dec. 9, 2020, which is herein incorporated by reference in its entirety.

GOVERNMENT SUPPORT

The invention was made with government support under 1614576 and 1719722 awarded by the National Science Foundation. The government has certain rights in the invention.

FIELD

The present disclosure generally relates to online content monitoring; and more particularly to a system and associated methods for detecting cyberbullying on social media sites.

BACKGROUND

Cyberbullying, defined as "aggressively intentional acts carried out by a group or an individual using electronic forms of contact, repeatedly or over time against victims who cannot easily defend themselves", has been rising at an alarming rate. Previous research has found that nearly 43% of teens in the United States have been victims of cyberbullying. In light of this, efforts aimed at automatically detecting cyberbullying—which seeks to predict whether or not human interactions within a social media session constitute cyberbullying—have a profound societal impact. However, detecting cyberbullying on social platforms is particularly challenging given that a social media session often consists of multi-modal information, for instance, an initial post, a sequence of comments, images/videos, and other social content such as the number of likes and shares.

Existing work on cyberbullying detection is mainly based on supervised methods, which often require a large annotated dataset for training. Although these approaches have shown promising results, they suffer from two major limitations: (1) Obtaining a large number of high-quality annotations for cyberbullying is time-consuming, labor-intensive, and error-prone because it requires circumspect examinations of multiple information sources such as images, videos, and numerous comments; (2) Current guidelines for labeling a session as cyberbullying may not be effective in the future due to the dynamic nature of language usage and social networks. Hence, alternative mechanisms for unsupervised cyberbullying detection are studied, which draws inferences from input social media data but without labeled responses Despite potential benefits, unsupervised cyberbullying detection also encounters several challenges: (1) Because cyberbullying typically consists of repetitive acts, the temporal dynamics of users' commenting behaviors adds nuanced understandings to the text-based methods that consider each comment as a distinct event over time. Such temporal characterization have been shown to be useful in distinguishing cyberbullying from non-bullying instances. Therefore, a key challenge is how to simultaneously model temporal dynamics and cyberbullying detection such that the two tasks mutually improve each other. (2) Social media sessions inherently present a hierarchical structure where words form a comment and comments form a session. Previous studies have revealed that modeling the hierarchical structure is useful for learning high-quality representations. Additionally, because meanings of words and comments are largely context-dependent, the sequential structure of words and comments need to be properly modeled for identifying relevant ones; (3) A straightforward approach for unsupervised cyberbullying detection is to use the off-the-shelf clustering algorithms (e.g., k-means). The effectiveness of this approach largely relies on the quality of input data, however, social media data is notorious for its noise, sparsity, and high-dimensionality. Applying dimensionality reduction to the input data still presents the drawback of decoupled training, i.e., representation learning and clustering are carried out separately It is with these observations in mind, among others, that various aspects of the present disclosure were conceived and developed.

BRIEF DESCRIPTION OF THE DRAWINGS

The application file contains at least one photograph executed in color. Copies of this patent application publication with color photographs will be provided by the Office upon request and payment of the necessary fee.

FIGS. 2A-2H are graphical representations showing t-SNE visualizations of the low dimensional representations using the Instagram dataset, red dots denoting instances of a bullying class and the blue points denoting instances of a non-bullying class;

FIGS. 5A and 5B are example social media sessions respectively predicted by the framework of FIG. 1 to be classified as bullying and non-bullying.

Corresponding reference characters indicate corresponding elements among the view of the drawings. The headings used in the figures do not limit the scope of the claims.

DETAILED DESCRIPTION

Introduction (Technical Problems)

Figure 1:
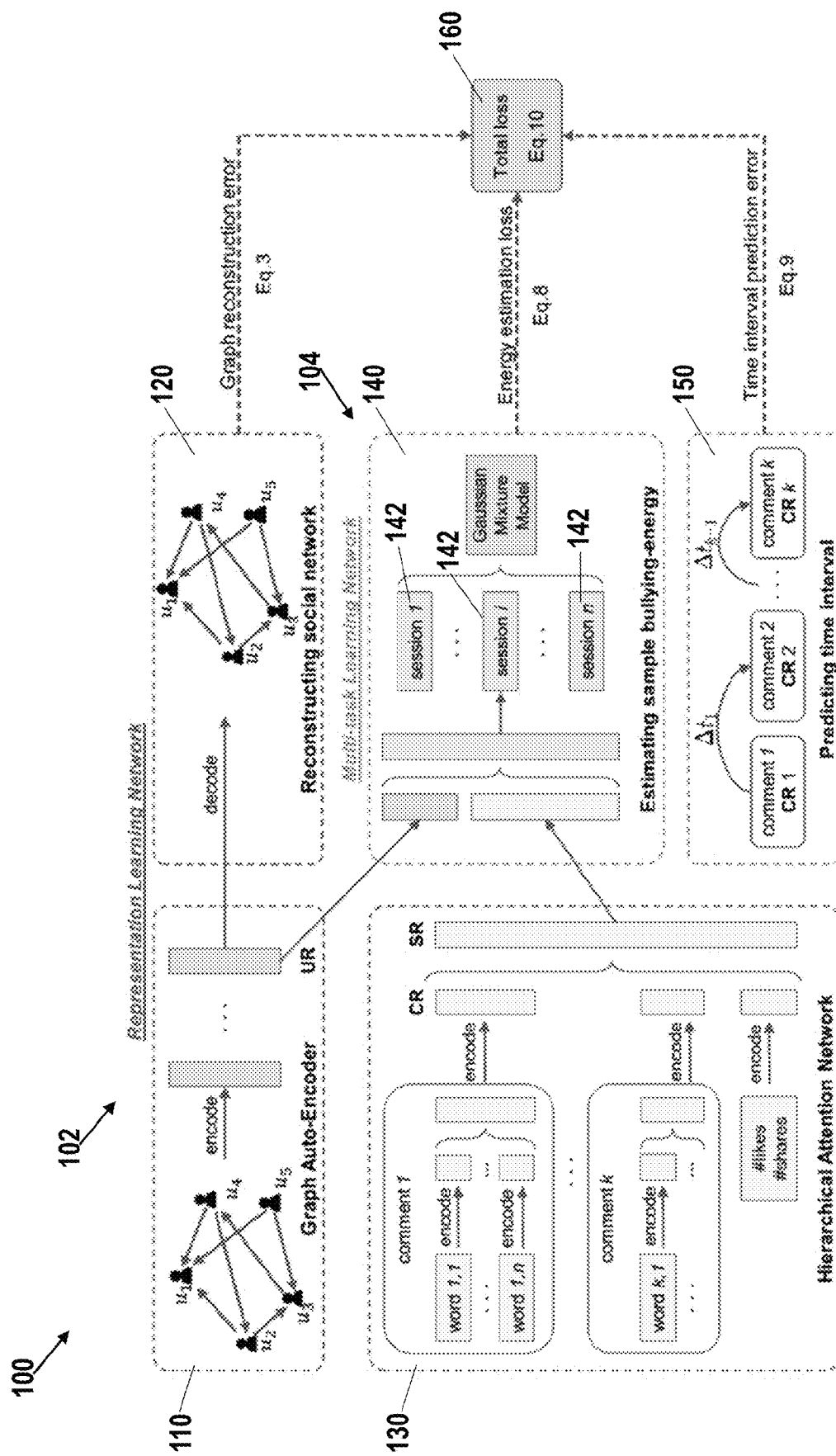
FIG. 1 is a simplified block diagram showing a framework for identification of bullying on social media sites.

Social media is a vital means for information-sharing due to its easy access, low cost, and fast dissemination characteristics. However, increases in social media usage have corresponded with a rise in the prevalence of cyberbullying. Most existing cyberbullying detection methods are supervised and, thus, have two key drawbacks: (1) The data labeling process is often time-consuming and labor-intensive; (2) Current labeling guidelines may not be generalized to future instances because of different language usage and evolving social networks.

Technical Solution

To address these limitations, an inventive (computer-implemented) system is disclosed that introduces a principled approach for unsupervised cyberbullying detection. The system includes two main components: (1) A representation learning network that encodes the social media session by exploiting multi-modal features, e.g., text, network, and time; and (2) a multi-task learning network that simultaneously fits the comment inter-arrival times and estimates the bullying likelihood based on a Gaussian Mixture Model. The system jointly optimizes the parameters of both components to overcome the shortcomings of decoupled training. One core contribution is an unsupervised cyberbullying detection model that not only experimentally outperforms the state-of-the-art unsupervised models, but also achieves competitive performance compared to supervised models.

In other words, various embodiments of a principled unsupervised learning framework for cyberbullying detection: Unsupervised Cyberbullying Detection via Time-Informed Gaussian Mixture Model (UCD)) are disclosed herein. In one aspect, a central feature of UCD is that it incorporates the comment inter-arrival times of a social media session, which enables the classification of cyberbullying instances using the full commenting history. UCD includes two main components: a representation learning network, which learns the compact multi-modal representations of a session; and a multi-task learning network, which predicts whether or not a session contains bullying behaviors while modeling the temporal dynamics of all comments. In particular, the representation learning network models social media sessions using a Hierarchical Attention Network (HAN) for textual features and a Graph Auto-Encoder (GAE) for user and network features. The multitask learning network then takes the multi-modal representations (e.g., text, user, and social network) as input to estimate the bullying likelihood using a time-informed Gaussian Mixture Model (GMM). The two UCD components are jointly optimized to mutually boost their learning effectiveness. The problem of unsupervised cyberbullying detection in social media platforms is addressed using this framework which automatically identifies bullying instances without labeled data. Experiments are conducted on two real-world social datasets from Instagram and Vine. Results show that UCD not only outperforms the state-of-the-art unsupervised models, but also achieves competitive performance against supervised models. Referring to the drawings, embodiments of framework for cyberbullying detection are illustrated and generally indicated as 100 in FIGS. 1-6.

Referring to FIG. 1, a computer-implemented framework and/or system 100 is shown including at least two components: (1) a representation learning network 102 that leverages a HAN 130 and a GAE 110 to obtain multi-modal representations, and (2) a multi-task learning network 104 that jointly optimizes a GMM-based energy estimation task 140 to detect cyberbullying instances and a temporal prediction task 150 to further refine the session representations with the comment inter-arrival times. The representation learning network 102 constructs multi-modal representations of social media sessions 142 and the multi-task learning network 104 simultaneously estimates the energy/likelihood of input samples and predicts time intervals between comments. Observe that the representation learning network combines user (session owner) representation (UR) in the Graph Auto-Encoder 110 and social representation (SR) in the Hierarchical Attention Network 130 to form the session representation. The constructed session representation is the input of the sample bullying energy estimation task 140. Meanwhile, the comment representations (CR) in HAN 130 are fed into the time interval prediction task 150. The overall loss, determined at block 150, comes from three sources: graph reconstruction error, energy estimation loss, and time interval prediction error.

Social media sessions usually consist of multi-modal information, such as text (e.g., comments) and social content (e.g., friendship networks, number of likes and shares). The representation learning network aims to transform these sparse and high-dimensional features into a low-dimensional session representation. HAN for Text.

The majority of prior literature on cyberbullying detection considered the comments in a social media session as independent events and directly extracted textual features from a chunk of combined comments. Notwithstanding its simplicity, this method largely overlooks the hierarchical structure of a social media session and the long-term dependencies among the sequentially posted comments. Previous studies showed that i) modeling document structure can significantly improve the quality of document representations; and ii) capturing long-term dependencies is particularly useful for sequential data modeling. In addition, different words and comments in a post are not equally relevant for cyberbullying detection, i.e., some words/comments are more important than others. For example, "You're a f**king loser!" and "Yeah, I'm a loser." both include the word loser, the former is, however, more likely to represent an instance of bullying. Therefore, attention mechanisms are also integrated to distinguish important words and comments. Following, a hierarchical attention network is employed to generate the textual representation for a social media session. The HAN approach of block 130 (FIG. 1) is a particularly good fit in cyberbullying detection as it models the two main levels of social media sessions (sequences of words and comments) and at each level, the model captures the long-term dependencies and integrates mechanisms to differentiate the importance of specific words and comments based on their context.

The hierarchical structure of the textual content can be described as follows: a social media session consists of a sequence of comments and each comment includes a sequence of words. Given a session with C comments where each comment i has $L_i$ words $\{w_{it}|t=1, 2, \ldots, L_i\}$, bi-directional Gated Recurrent Units (GRUs) are used to model both the word sequence in a comment and the comment sequence in a session:

$$\vec{s}_{it} = \overrightarrow{GRU}(W_e w_{it}), \forall t \in [1, L_i], i \in [1, C]$$

$$\overleftarrow{s}_{it} = \overleftarrow{GRU}(W_e w_{it}), \forall t \in [L_i, 1], i \in [1, C] \quad (1)$$

where each word $w_{it}$ is first mapped to a latent space with parameter $W_e$. The resulting annotation for word $w_{it}$ is a concatenation of the forward and backward hidden states, $s_{it} = [\vec{s}_{it}, \overleftarrow{s}_{it}]$. To differentiate the word importance, the attention mechanism is adopted to automatically detect words that are more relevant and then aggregate the representation of weighted words to form a comment vector $$\alpha_{it} = \frac{\exp(h_{it}^T u_w)}{\sum_t \exp(h_{it}^T u_w)}; c_i = \sum_t \alpha_{it} s_{it}, \quad (2)$$

where hit is the output of a fully connected layer of $s_{it}$ and $u_w$ denotes a word-level context vector. $\alpha_{it}$ denotes a normalized weight describing the importance of word $w_{it}$. Similarly, the final textual representation v of a social media session can be computed using the encoded comment vectors (i.e., replacing $w_{ii}$ of Eq. 1 with $c_i$). Further, a dense layer is included to project the social content, i.e., number of likes and shares, into a latent space. The resulting vector p is concatenated with v to form the multi-modal representation of a social media session o=[v,p].

GAE for Attributed Social Networks

Self-selection bias (grouping with similar others) and peer influence are closely connected with bullying behaviors in offline environments. Research in human communication reveals a similar observation that online social network positioning is a comparably strong predictor for cyberbullying detection. Hence, it is important to consider the social network structure and peer influence from similar users for improving the performance of cyberbullying detection.

The representation learning network learns user representation by exploiting information from social networks where nodes denote social media users with corresponding profile information being the node attributes, and edges denote the follower/followee relationships. Here, GAE is employed (block 110, FIG. 1) to embed users' attributes as low-dimensional vectors such that users with structural proximity in the social network are close. As one of the most powerful node embedding approaches, GAE has been applied to several challenging learning tasks such as link prediction and node clustering. GAE can effectively incorporate node features and learn more interpretable user representations. The key of GAE is the encoding-decoding scheme, i.e., GAE encodes nodes into low-dimensional vectors which are then decoded to reconstruct the original network structure. Suppose one is given a social network $\mathcal{G}=(\mathcal{V},\varepsilon)$ with $U=|\mathcal{V}|$ users. The adjacency matrix of this graph is $A \in \mathbb{R}^{U \times U}$. The User-Feature matrix is $X \in \mathbb{R}^{U \times D}$ with D being the feature dimension. GAE then uses a graph convolutional network (GCN) encoder and an inner product decoder to learn a latent matrix Z by minimizing the following reconstruction error:

$$g = \frac{1}{2}\|A - \hat{A}\|_2^2,$$

$$\text{with } \hat{A}=\sigma(ZZ^T), Z=\text{GCN}(X,A) \quad (3)$$

where $\sigma(\cdot)$ is the logistic sigmoid function. The final representation of a session is the concatenation of user (owner) representation and the representation output from HAN, i.e., ss=[z, o], where z is a row vector of Z. This multi-modal representation is then fed into the multi-task learning network.

3.2 Multi-Task Learning Network

Given the multi-modal representation of input sessions, the multi-task learning network 104 simultaneously (1) estimates the sample bullying-energy/likelihood (block 140); and (2) models the inter-arrival times of a sequence of comments in a social media session (block 150). These two tasks can mutually enhance each other's performance in the training stage. To this end, the multi-task learning network 104 enables the framework to jointly learn session representations and discover cyberbullying instances.

Bullying-Energy Estimation

The first task of the multi-task learning network is to estimate the sample energy (likelihood) and classify samples with high energy (low likelihood) as bullying instances. A primary benefit of energy-based models is the flexibility to specify the energy expression. GMM-based density estimator 140 is constructed to infer the underlying probability density function. GMM, a widely used unsupervised learning method, seeks to fit a multi-modal distribution with multiple unimodal Gaussian distributions which are the most commonly used distributions for modeling real-world unimodal data. Previous work has shown that GMM is more effective than simple models for data with complex structures. Given the complexity and multi-modal nature of social media data, GMM is leveraged to perform density estimation tasks over multi-modal representations.

Let the number of mixture components be K and the latent representation of a social media session 142 be ss, the mixture membership predictions must first be generated for ss. Parameters of GMM are then estimated using the predicted membership to obtain the energy estimation of ss. Specifically, ss is first fed into a multi-layer network (MLN) parameterized by $\theta_m$. The output is denoted as $p_{MLN}$:

$$p_{MLN} = \text{MLN}(ss; \theta_m) \quad (4)$$

The probability of ss belonging to each component can be estimated as follows:

$$\hat{m} = \text{softmax}(p_{MLN}) \quad (5)$$

where $\hat{m}$ is a K-dimensional vector. Given a batch of N social media session representations $\{ss_1, ss_2, \ldots, ss_N\}$, together with the corresponding predicted memberships, the parameters in GMM can further be estimated as follows:

$$\hat{\phi}_k = \sum_{i=1}^{N} \frac{\hat{m}_{ik}}{N}; \hat{\mu}_k = \frac{\sum_{i=1}^{N} \hat{m}_{ik} ss_i}{\sum_{i=1}^{N} \hat{m}_{ik}} \quad (6)$$

$$\hat{\Sigma}_k = \frac{\sum_{i=1}^{N} \hat{m}_{ik} (ss_i - \hat{\mu}_k)(ss_i - \hat{\mu}_k)^T}{\sum_{i=1}^{N} \hat{m}_{ik}} \quad (7)$$

where $\hat{\phi}_k$, $\hat{\mu}_k$ and $\hat{\Sigma}_k$ the mixture probability, mean, and covariance of component $k \in \{1, 2, \ldots, K\}$ in GMM, respectively. $\hat{m}_{ik}$ denotes the probability of $ss_i$ in the k-th component of GMM. To build the probability density function, the energy-based model is leveraged which relies on a specific parameterization of the energy (negative log likelihood). The energy level of a session is defined as $$E(ss_i; \theta_m) = -\log\left(\sum_{k=1}^{K} \hat{\phi}_k \frac{\exp\left(-\frac{1}{2}(ss_i - \hat{\mu}_k)^T \hat{\Sigma}_k^{-1} (ss_i - \hat{\mu}_k)\right)}{\sqrt{|2\pi \hat{\Sigma}_k|}}\right) \quad (8)$$

where $|\cdot|$ is the determinant of a matrix. The model then classifies a session as cyberbullying if its energy is above a predefined threshold $\tau \in (0,1)$ in the testing phase. In practice, $\tau$ is typically set to a comparatively large value, i.e., a cyberbullying session is in general associated with high energy (hence low likelihood). This is because bullying samples are less frequently observed in real-world datasets, as suggested by the statistics in Table 1 as well as in previous literature.

Temporal Dynamics Fitting

Cyberbullying is commonly defined as a repeated act of aggression that develops over time. However, most of the existing computational models consider each comment in a social media session as an isolated event. Therefore, they largely overlook the temporal dynamics of users' commenting behavior. Here, the time interval prediction model 150 seeks to predict the inter-arrival times between comments for obtaining additional feedback from the temporal dynamics. This feature enables the model to exploit the commonalities and differences across bullying-energy estimation and temporal-dynamics prediction for improving the final cyberbullying detection performance.

The output $e_{in}$ of the comment encoder is first obtained for comment i in session n from the HAN module 130 and then conduct a time interval prediction task as follows:

$$\ell = \sum_{i=1}^{C} \frac{1}{2} \|f(e_{in}; \theta_\ell) - \Delta t_i\|^2, \quad (9)$$

where f represents a regression model, $\theta_\ell$ denotes the associated parameters, and $\Delta t_i = t_i - t_i - 1$ is the time interval between comment i−1 and i. $t_0$ was set to be 0. Let d denote the dimensions of the latent representation of social media sessions, $\theta_h$ the parameters of HAN and $\theta_g$ the parameters of GAE, the final objective function of UCD (block 160 of FIG. 1) can be constructed as:

$$J = \sum_{n=1}^{N} \sum_{i=1}^{C} \frac{1}{2} \|f(e_{in}; \theta_\ell) - \Delta t_i\|^2 + \frac{\lambda_1}{N} \sum_{i=1}^{N} E(ss_i; \theta_m) + \quad (10)$$

$$\frac{\lambda_2}{2} \|A - \hat{A}\|_2^2 + \lambda_3 P(\hat{\Sigma}); \text{ with } P(\hat{\Sigma}) = \sum_{k=1}^{K} \sum_{j=1}^{d} \frac{1}{\hat{\Sigma}_{kjj}}$$

$P(\hat{\Sigma})$ accounts for the singularity issue in GMM, $\lambda_1$, $\lambda_2$, and $\lambda_3$ are the hyperparameters that control the balance among time interval prediction error, energy estimation loss, graph reconstruction error and regularization for GMM. Specifically, the objective function consists of four components (ordered as presented in Eq. 10).

The first component is the loss function that describes the prediction error of time interval prediction.

The second component $E(ss_i; \theta_m)$ models the likelihood (sample energy) that session i is observed. Here, minimizing the energy level of an input session will maximize the likelihood of observing the session.

The third component is the reconstruction error of GAE in the representation learning network. A lower error indicates that the learned user representations better preserve the structure of the original attributed social network.

Due to the singularity issue in GMM, small values on the diagonal entries of the covariance matrices $\hat{\Sigma}$ are penalized.

The model jointly optimizes the representation learning network 102 and the multi-task learning network 104 to learn effective representations for cyberbullying detection. The model is trained by minimizing Eq. 10 using the Adam optimization algorithm, where the error backpropagates through the representation learning network, the bullying-energy estimation task, and the time-interval prediction task

EVALUATION

In this section, both quantitative and qualitative analyses are presented to evaluate the UCD framework. Specifically, the following research questions are answered:

Effectiveness: a. How effective is UCD compared to existing unsupervised learning approaches and supervised classification models? b. How does each module, i.e., HAN, GAE, and temporal modeling, affects the cyberbullying detection performance of UCD Datasets The experiments use two public datasets crawled from Instagram and Vine (now in archive status). The basic statistics of these datasets are presented in Table 1.

TABLE 1

Basic statistics for Instagram and Vine datasets.

| Datasets | #Sessions | #Bully | #Non-bully | #Comments |
|---|---|---|---|---|
| Instagram | 2,218 | 678 | 1,540 | 155,260 |
| Vine | 970 | 304 | 666 | 78,250 |

Instagram: Instagram is a popular social media platform. It is also the platform on which the highest prevalence of cyberbullying has been reported. Using a snowball sampling method, the authors in identified 41K Instagram users, 61% of whom had public profiles. For each public user, the collected data includes the media objects the user had posted, the comments of session, the list of user followers/followees, and the list of users who have commented/liked the media objects. Data labeling (whether the session constituted cyberbullying or not) was conducted on Crowd-Flower—a crowdsourcing website—using a procedure whereby each session was labeled by five different contributors. A session is labeled as cyberbullying if three or more contributors had labeled this session as cyberbullying. Overall, the Instagram dataset includes 2,218 labeled social media sessions.

Vine: The Vine dataset is used for analyzing cyberbullying in the context of a video-based online platform. It was crawled using a snowball sampling method in which a random user u is first selected as a seed and then the crawling continues with the users that u follows. Each session includes videos, captions, and associated comments (note that social network information was not available for this dataset). All sessions in the dataset have at least 15 comments. Similar to the labeling process used for the Instagram data, a total of 970 Vine sessions were labeled (as cyberbullying vs. non-bullying) using CrowdFlower.

The following information gathered from a media session is used:

Attributed social network: A social network where each node represents a user and has attributes such as the number of total followers and followees. The edges denote the following and followed-by relationships.

Text: The bag-of-words representation of the captions and comments. Each column indicates a term from the corpus and the entry is the corresponding frequency count.

Time: The posting timestamps of a media object and its associated comments. The time difference between any two consecutive comments is extracted.

Social content: The number of likes and shares of a post receives.

Experimental Setup

To answer the first research question, UCD is compared with multiple unsupervised learning models:

k-means. k-means is one of the most common clustering algorithms. It iteratively assigns each data point to one of k groups with the smallest distance.

HAE. HAE is an LSTM model that hierarchically builds embeddings for social media sessions from comments and words. k-means was also used to cluster the learned representations.

DCN. DCN is a deep learning-based clustering algorithm that regulates auto-encoder performance by using k-means.

DAGMM. DAGMM jointly optimizes a deep auto-encoder that learns low-dimensional representations and a GMM that estimates the density function of the latent representations.

XBully. XBully learns multi-modal representations of social media sessions and then feeds them into a subsequent classification model. The classification model was replaced with k-means.

GHSOM. As of now, Growing Hierarchical Self-Organizing Map (GHSOM) is one of the only existing models for unsupervised cyberbullying detection. It extracts sentiment, syntactic, and semantic features from text and social network data. The features are then fed into the GHSOM tool5 for clustering.

To provide a comprehensive analysis of UCD, the following supervised methods are also included:

Naïve Bayes (NB). NB is a probabilistic classifier based on Bayes' theorem with strong independence assumptions between the features. It is one of the most popular (baseline) methods for text classification.

Random Forest (RF). RF consists of several individual decision trees that operate as an ensemble. Each individual tree generates a class prediction and the class with the most votes becomes the model's prediction.

Logistic Regression (LR). LR is a statistical model that uses a logistic function to model a binary dependent variable. It is a common baseline algorithm for binary classification.

For baselines using k-means, the number of clusters is set to 2, and label the cluster with fewer elements as bullying and the other one as non-bullying. This assumption is supported by the statistics in Table 1 and also generally evident in other real-world cyberbullying datasets. Note that the method (UCD) does not require this assumption as it optimizes Eq. 10 for clustering bullying and non-bullying instances. The following variants of UCD are implemented to examine the impact of each UCD component.

UCDXtext. UCD without HAN. This variant is not reported for Vine given that its social network information is not available.

UCDXtime. UCD without time interval prediction.

UCDXgraph. UCD without GAE.

Following previous literature, four common evaluation metrics—Precision, Recall, F1, and AUROC (Area Under the Receiver Operating Characteristic Curve). Note that this study is are more interested in detecting cyberbullying instances, therefore, Precision, Recall and F1 is reported corresponding to the bullying (positive) class. While the overall performance can be effectively measured by F1 and AUROC scores, multiple application scenarios of cyberbullying detection could particularly benefit from the identification of as many positive cases as possible, i.e., high Recall.

Parameter Setting. Based on Eq. 10, the UCD framework has five hyperparameters: (1) $\lambda_1$, for balancing the sample bullying-energy loss; (2) $\lambda^2$, for controlling the weight of the reconstruction error of GAE; (3) $\lambda_3$, for controlling the weight of diagonal entries in the covariance matrices; (4) K,[6] the number of mixtures in the GMM; and (5) $\tau \in (0, 1)$ a pre-defined energy threshold. The parameters were set based on sensitivity analysis, which is detailed herein. Specifically, $\lambda_1 = 1e-4$ $\lambda_3 = 1e-9$ and K=5 for both datasets. The energy threshold is set to 65% for Instagram and 70% for Vine. Therefore, Instagram and Vine test sessions with the highest 35% and 30% energy values will be classified as bullying cases and the rest as non-bullying cases, respectively. For Instagram, $\lambda_2 = 0.01$. For the baseline methods, similar sensitivity analysis were conducted on the key parameters reported in their original papers. For both datasets, 80% of the data was used for training and the rest for testing. Each experiment is run 10 times, mean and standard deviations are reported.

TABLE 2

Performance evaluation with Instagram data.

| Metrics | Precision | Recall | F1 | AUROC |
|---|---|---|---|---|
| Unsupervised Learning Models | | | | |
| k-means | 0.79 ± 0.02 | 0.29 ± 0.04 | 0.43 ± 0.05 | 0.63 ± 0.02 |
| XBully | 0.32 ± 0.02 | 0.47 ± 0.03 | 0.38 ± 0.02 | 0.51 ± 0.02 |
| HAE | 0.53 ± 0.02 | 0.27 ± 0.03 | 0.35 ± 0.03 | 0.53 ± 0.01 |
| DCN | 0.87 ± 0.02 | 0.23 ± 0.02 | 0.36 ± 0.02 | 0.61 ± 0.01 |
| DAGMM | 0.56 ± 0.18 | 0.56 ± 0.18 | 0.56 ± 0.18 | 0.56 ± 0.03 |
| GHSOM | 0.35 ± 0.12 | 0.38 ± 0.06 | 0.36 ± 0.08 | 0.54 ± 0.11 |
| UCDXtext | 0.33 ± 0.01 | 0.34 ± 0.01 | 0.33 ± 0.01 | 0.53 ± 0.02 |
| UCDXtime | 0.47 ± 0.02 | 0.48 ± 0.01 | 0.48 ± 0.01 | 0.63 ± 0.01 |
| UCDXgraph | 0.56 ± 0.02 | 0.57 ± 0.01 | 0.57 ± 0.02 | 0.19 ± 0.01 |
| UCD | 0.59 ± 0.02 | 0.66 ± 0.02 | 0.63 ± 0.02 | 0.73 ± 0.01 |
| Supervised Learning Models | | | | |
| NB | 0.40 ± 0.03 | 0.69 ± 0.03 | 0.51 ± 0.03 | 0.62 ± 0.02 |
| RF | 0.78 ± 0.03 | 0.53 ± 0.03 | 0.63 ± 0.03 | 0.73 ± 0.01 |
| LR | 0.79 ± 0.03 | 0.55 ± 0.03 | 0.64 ± 0.03 | 0.74 ± 0.03 |

TABLE 3

Performance evaluation with Vine data.

| Metrics | Precision | Recall | F1 | AUROC |
|---|---|---|---|---|
| Unsupervised Learning Models | | | | |
| k-means | 0.03 ± 0.08 | 0.00 ± 0.00 | 0.00 ± 0.01 | 0.50 ± 0.00 |
| XBully | 0.48 ± 0.08 | 0.27 ± 0.03 | 0.34 ± 0.04 | 0.57 ± 0.02 |
| HAE | 0.18 ± 0.04 | 0.34 ± 0.08 | 0.23 ± 0.04 | 0.57 ± 0.03 |
| DCN | 0.29 ± 0.20 | 0.32 ± 0.39 | 0.22 ± 0.19 | 0.50 ± 0.03 |
| DAGMM | 0.36 ± 0.09 | 0.31 ± 0.08 | 0.33 ± 0.08 | 0.54 ± 0.00 |
| GHSOM | 0.32 ± 0.09 | 0.38 ± 0.10 | 0.34 ± 0.08 | 0.50 ± 0.07 |
| UCDXtime | 0.33 ± 0.02 | 0.39 ± 0.03 | 0.36 ± 0.02 | 0.56 ± 0.01 |
| UCDXgraph | 0.43 ± 0.02 | 0.40 ± 0.03 | 0.41 ± 0.02 | 0.58 ± 0.01 |
| Supervised Learning Models | | | | |
| NB | 0.49 ± 0.05 | 0.72 ± 0.05 | 0.58 ± 0.04 | 0.70 ± 0.04 |
| RF | 0.67 ± 0.05 | 0.42 ± 0.05 | 0.51 ± 0.04 | 0.66 ± 0.02 |
| LR | 0.62 ± 0.05 | 0.57 ± 0.05 | 0.59 ± 0.04 | 0.71 ± 0.03 |

Quantitative Results

For the Instagram dataset, UCD and its variants with all baselines. Due to the lack of social network information in the Vine dataset, UCD and UCDXtext cannot be evaluated with Vine. The best results for unsupervised and supervised models are highlighted in Table 2 and 3 with bold text. The results presented for RF are different from previously reported results. It is believed that the case because the original work: 1) considered additional features such as the percentage of negative comments, emotions exhibited in videos, and latent semantic features (10 topics based on the comments using LDA), and 2) performed oversampling (SMOTE) to balance the Vine dataset. The original Vine dataset is used to better reflect real-world scenarios.

It is observed that (1) UCD achieves the best performance in Recall, F1, AUROC, and competitive Precision compared to the unsupervised baselines for both datasets. For the Instagram dataset, UCD shows 15.9%, 19.7%, and 35.2% of improvement on AUROC compared to the results using raw features (i.e., k-means), representation learning (i.e., DCN), and the unsupervised cyberbullying detection model GHSOM, respectively. AUROC considers all possible thresholds for classification and is a more appropriate metric when datasets are imbalanced; (2) Imbalanced datasets affect the trade-off between Recall and Precision. While achieving superior Precision, baseline models DCN and k-means show poor Recall. It is inferred that these models fail to identify most of the cyberbullying instances, which is undesired in many cyberbullying applications; and (3) UCD achieves competitive Recall, F1 and AUC scores compared to supervised methods using the Instagram dataset. For instance, LR improves F1 by 1.6% over UCD whereas NB is outperformed by UCD regarding these three metrics. The Precision of UCD is comparatively low implying that its energy threshold favors identifying cyberbullying instances, therefore, UCD miss-classifies more non-bullying instances than baseline methods. In the Vine dataset, the supervised methods show larger advantages over UCDXgraph, reflecting the importance of integrating social network information and using larger datasets in order to maximize the performance of UCD. Of particular interest is that UCD also achieves more balanced Precision and Recall values compared to supervised models.

The following observations are made when comparing UCD with its own variants: (1) UCD achieves better performance in all metrics, especially against UCDXtext and UCDXtime, leading us to conclude that each submodule (HAN, GAE, and temporal analysis) has a positive influence on UCD's performance; (2) The performance of UCDXtext drops significantly compared to other variants, highlighting the importance of textual features in cyberbullying detection; (3) UCDXgraph outperforms UCDXtime, indicating that temporal analysis can provide more relevant information for cyberbullying detection than social network properties and thus highlighting the importance of modeling temporal patterns; and (4) the framework performs better on Instagram data than on Vine data. This is in part due to the smaller sample size and lack of social network information in the Vine dataset.

In summary, UCD outperforms unsupervised baselines in terms of identifying cyberbullying instances and the overall performance. Compared to supervised models, it shows competitive performance when the sample size is comparatively large and the social network information is available. None of the evaluated methods achieves high performance in detecting both bullying and non-bullying instances. Future work is encouraged to investigate such methods.

Qualitative Analysis

Qualities of the learned multi-modal representations are further investigated using t-SNE visualizations in FIGS. 2A-2H. Taking Instagram as an example, the following observations were made:

As shown in FIG. 2H, UCD better separates the bullying and non-bullying samples in the latent space. The results of most of the other models, particularly XBully, HAE, DCN, and UCDXtext, yield more overlapped clusters.

From the results of DAGMM and UCD, it is observed that models with GMM can learn discriminative representations, which is evident by the greater separation between bullying and non-bullying clusters). The overall performance of UCD is better than DAGMM, indicating that UCD benefits from the joint optimization of cyberbullying detection and time interval prediction.

Both UCD and DAGMM outperform DCN. With a pre-trained auto-encoder, DCN can get easily stuck in a local optimum for achieving lower reconstruction error and could be suboptimal for the subsequent density estimation tasks. A joint optimization of representation learning, bullying-energy estimation, and time interval prediction can help avoid these local optimal cases and achieve better learning performance.

In contrast to other baseline methods, such as XBully and DCN, HAE in FIG. 2B generates large regions that are primarily populated by either bullying or non-bullying samples. This confirms that modeling the hierarchical structure of a session has an important impact in cyberbullying detection.

UCDXtime produces two main bullying clusters (two red clusters), UCDXgraph generates similar results to UCD, and UCDX-text fails to learn discriminative representations, evidenced by the overlap between the bullying and non-bullying clusters.

Parameter Analysis

Figure 3A:
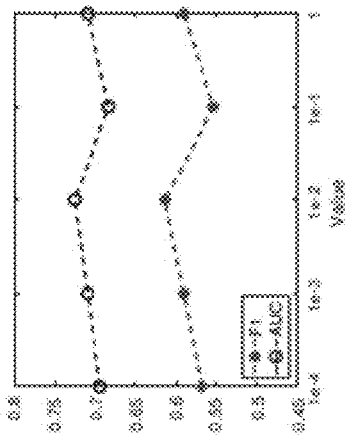
FIGS. 3A-3D are graphical representations showing a parameter study w.r.t the AUROC and F1 scores.
Figure 3B:
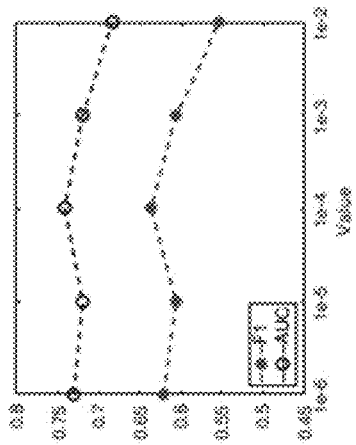
Figure 3C:
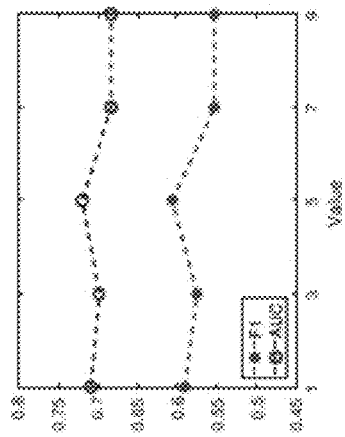
Figure 3D:
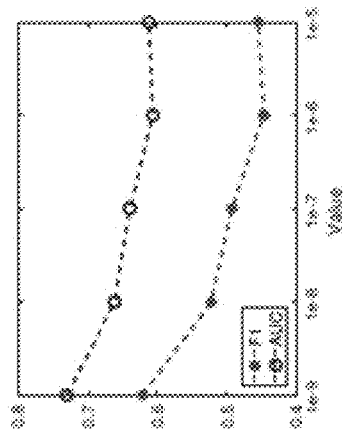
Figure 4B:
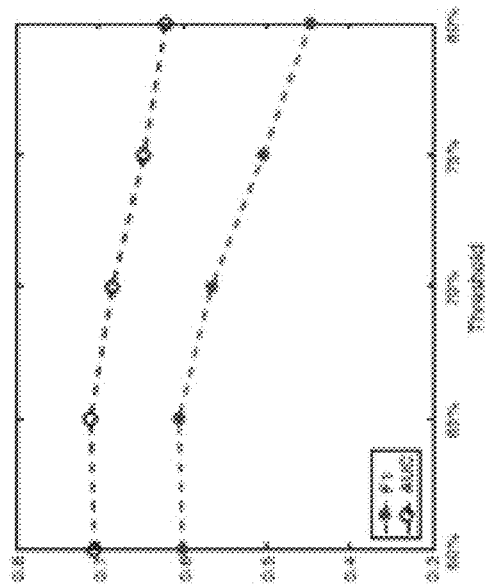
FIGS. 4A and 4B are graphical representations showing effects of $\tau$ on AUROC and F1 scores.
Figure 4A:
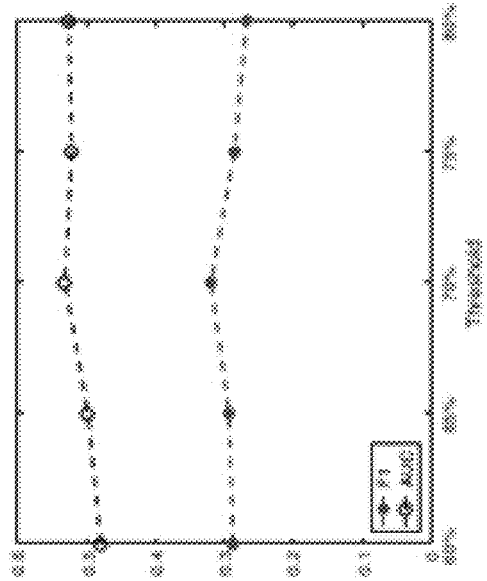

The UCD model has five core parameters ($\lambda_1$, $\lambda_2$, $\lambda_3$, K, $\tau$) for balancing the weights of bullying-energy estimation loss, reconstruction error, regularization of the covariance matrices, the number of mixtures in GMM, and the energy threshold, respectively. Here, the training data is further divided into training (80%) and validation (20%) sets. To investigate the effects of the first four parameters, experiments are ran on the Instagram dataset varying one parameter at a time and evaluate how it affects the overall performance. The sensitivity analysis is shown w.r.t. AUROC and F1 scores in FIGS. 3A-3D. It is observed that large $\lambda_1$ that overemphasizes the energy estimation loss can lead to poor performance regarding both F1 and AUROC scores. The trend of varying K is similar to that of $\lambda^1$, i.e., the performance drops when the number of components in GMM becomes too large. The best performance is obtained when $\lambda^1$ is set to 1e−4 and K is set to 5. In contrast, the performance of varying $\lambda^2$ displays an ascending trend in a certain range as shown in FIG. 3B. The UCD model with a slightly large $\lambda^2$ controlling the importance of GAE is more likely to obtain better results. Unsurprisingly, when the covariance matrices in GMM are given too much penalization, i.e., a large $\lambda^3$, the F1 and AUROC scores decrease significantly, as shown in FIG. 3C. The last parameter $\tau$ represents the threshold for identifying bullying instances. Given that UCD largely relies on $\tau$ for cyberbullying detection, both Instagram and Vine datasets are used to examine its influence. The results are presented in FIGS. 4A and 4B. It shows that UCD is more robust to $\tau$ for Vine, whereas its performance slightly decreases for Instagram as $\tau$ increases. In practice, $\lambda^3$ should be set to a small value, and a proper value for parameter $\tau$ should be experimentally identified. In general, UCD is robust to most of the model parameters, and consequently can be tuned for various real-world applications.

Case Study

In this subsection, two Instagram sessions (FIGS. 5A and 5B) are presented, one detected as bullying and one detected as non-bullying by UCD. Each are visualized with the hierarchical attention information to validate UCD's capability of selecting informative comments and words in a session. The results can be seen in FIGS. 5A and 5B. Every line in each sub-figure is a comment. Shades of blue denote comment weights and shades of red denote word weights. Because both sessions have many comments, only a portion of the content is shown here. FIG. 5A shows that UCD can select the words that are more strongly associated with bullying, such as f*ckin, b*tch, disgusted and hell. In FIG. 5B, it is observed that UCD can also deal with complex cross-comment context. For example, although the session might appear to be a bullying session when looking only at the second comment from the bottom, UCD assigns the session to the non-bullying cluster because it also considers the context of that comment.

Discussion

In this section, the reasons behind the performance of UCD, its research impact, and practical considerations are elaborated on. UCD benefits from the following design mechanisms.

Multi-modal features. UCD actively leverages multi-modal data including text, user information, social network information, and social content. UCD also benefits from deep learning mechanisms specifically designed for each modality, e.g., HAN models the sequence of comments and the hierarchy of a session. Previous work reported the benefits of using multi-modal data to contribute complementary application domain insights and enable better learning performance.

Complementary temporal analysis. In addition to multi-modal representation learning, UCD simultaneously estimates the energy level associated with bullying instances and predicts the time-interval between comments to refine the session representations. Temporal modeling adds nuance to the representation learning network that otherwise would not consider comment evolution Joint optimization. A key property that differentiates UCD from other approaches is that it jointly optimizes the parameters for representation learning, temporal modeling, and bullying-energy estimation. This approach prevents the drawbacks of decoupled training As one of the first attempts to detect cyberbullying in an unsupervised manner, UCD explores the use of deep learning algorithms and shows they can achieve relatively high performance levels. The development of UCD has relevant research and practical impact. UCD addresses key limitations of supervised models: (1) cyber-bullying labeled data could be either unavailable or insufficient for training a good supervised classifier, (2) data labeling is often time-consuming and labor-intensive, and (3) the guidelines used for assigning cyberbullying labels in a current session cannot always be generalized to future sessions due to the dynamic nature of language and social networks.

Computer-Implemented System

Figure 6:
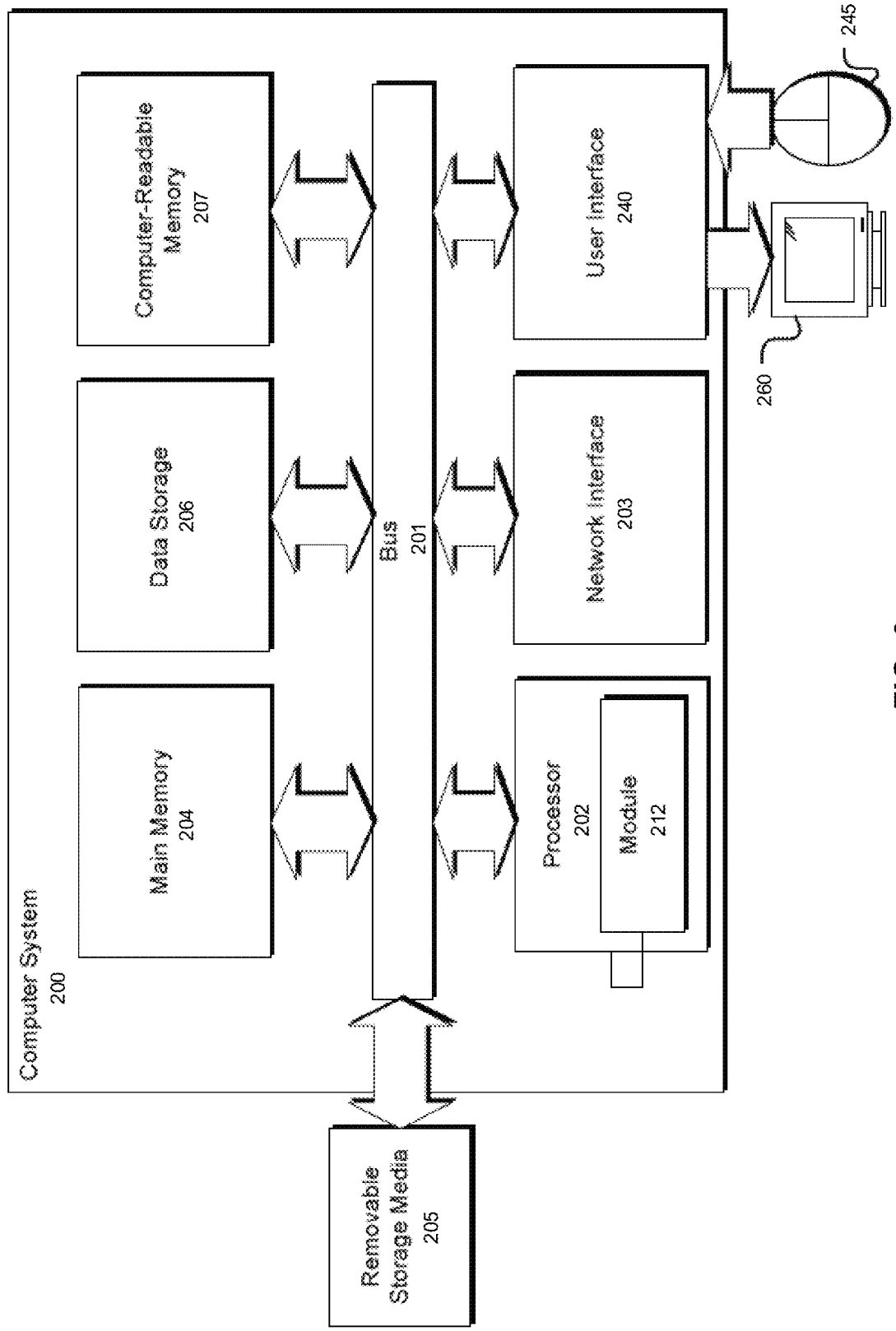
FIG. 6 is a simplified diagram showing an exemplary computing system for implementation of the framework of FIG. 1.

FIG. 6 illustrates an example of a suitable computing and networking environment (computer system 200) which may be used to implement various aspects of the present disclosure. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of the system application 190 or otherwise, may include a hardware-implemented module and may accordingly configure a processor 202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 200 may be a general purpose computing device 200, although it is contemplated that the networking environment 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 200 may include various hardware components, such as a processing unit 202, a main memory 204 (e.g., a memory or a system memory), and a system bus 201 that couples various system components of the general purpose computing device 200 to the processing unit 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 200 may further include a variety of computer-readable media 207 that includes removable/non-removable media and volatile/nonvolatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device 200 (e.g., during start-up) is typically stored in ROM. RAM typically contains data and/or program modules that are immediately accessible to and/or presently being operated on by processing unit 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball, or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 245 are often connected to the processing unit 202 through a user interface 240 that is coupled to the system bus 201, but may be connected by other interface and bus structures, such as a parallel port, game port or a universal serial bus (USB). A monitor 260 or other type of display device is also connected to the system bus 201 via user interface 240, such as a video interface. The monitor 260 may also be integrated with a touch-screen panel or the like.

The general purpose computing device 200 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device 200, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A framework for identification of cyber-bullying on social media sites, comprising:
    a model trained according to a representation learning framework configured to:
        construct one or more multi-modal representations of one or more social media sessions; and
    a learning network configured to:
        estimate a likelihood of bullying associated with each of the one or more social media sessions using the one or more multi-modal representations; and
        predicting a time interval between one or more comments of the one or more social media sessions;
    wherein a graph reconstruction error determined by the representation learning framework, an energy estimation loss determined by the learning network, and a time interval prediction error determined by the learning network are used to determine a total loss associated with bullying identification; and
    wherein the total loss associated with bullying identification is used to optimize the representation learning framework and the learning network,
    wherein the model is configured for unsupervised cyberbullying detection and incorporates inter-arrival times of a social media session to leverage temporal dynamics associated with repeated acts of aggression over time.

2. The framework of claim 1, wherein the representation learning network comprises:
    a graph auto-encoder configured to embed user attributes associated with each of the one or more social media sessions as low-dimensional vectors representative of a social network structure of each of the one or more social media sessions.

3. The framework of claim 2, wherein the graph-auto encoder is implemented using one or more neural networks.

4. The framework of claim 1, wherein the representation learning network comprises:
    a hierarchical attention network configured to generate a textual representation of each of the one or more social media sessions by modeling a sequence of words and a sequence of comments for each of the one or more social media sessions.

5. The framework of claim 4, wherein the hierarchical attention network captures long-term contextual dependencies between the sequence of words and the sequence of comments for each of the one or more social media sessions.

6. The framework of claim 1, wherein the learning framework comprises:
    a Gaussian mixture model-based density estimator configured to infer a probability density function associated with likelihood estimation of bullying in the one or more social media sessions.

7. The framework of claim 6, wherein the Gaussian mixture model-based density estimator uses one or more user attributes and one or more textual attributes determined by the representation learning network to estimate the likelihood estimation of bullying in the one or more social media sessions.

8. A processor adapted for cyberbullying detection, the processor configured to:
    implement a model configured via a representation learning network that constructs multi-modal representations of social media sessions; and
    implement a multi-task learning network that simultaneously with the representation learning network estimates a likelihood of input samples and predicts time intervals between comments associated with the social media sessions,
    wherein implementation of the representation learning network and the multi-task learning network outputs,
    wherein the model is configured for unsupervised cyberbullying detection and incorporates inter-arrival times of a social media session to leverage temporal dynamics associated with repeated acts of aggression over time.

9. The processor of claim 8, being further configured to:
    combine, by the representation learning network a user representation in a graph auto-encoder and social representation in a hierarchical attention network to form a sessions representation.

10. A tangible, non-transitory, computer-readable media having instructions encoded thereon, such that a processor implementing the instructions, is operable to:
    implement a system for unsupervised cyberbullying detection via time-informed Gaussian Mixture Model (UCD) that predicts bullying instances without labeled data, the system incorporating comment inter-arrival times of a social media session which accommodates classification of cyberbullying instances using a full commenting history,
    wherein the system includes a representation learning network that learns a compact multi-modal representation of the social media session and a multi-task learning network that predicts whether or not the social media session contains bullying behaviors while modeling temporal dynamics of all social media comments, and
    wherein the representation learning network models social media sessions using a hierarchical attention network (HAN) for textual features of a plurality of features and a graph auto-encoder for user and network features of the plurality of features, and the multi-modal task learning network takes the plurality of features as input to estimate a likelihood of bullying using a time-informed Gaussian Mixture Model (GMM).

* * * * *